United States Patent [19]

Farr et al.

[11] Patent Number: 5,317,927
[45] Date of Patent: Jun. 7, 1994

[54] MEASURING DEVICE

[75] Inventors: Peter Farr, Weingarten; Heinz Schuhbaum, Barbelroth; Otfried Stuck, Durmersheim; Wolfgang Weisenburger, Au/Rhein, all of Fed. Rep. of Germany

[73] Assignee: Johann Baptist Rombach GmbH & Co. KG, Karlsruhe, Fed. Rep. of Germany

[21] Appl. No.: 953,802

[22] Filed: Sep. 30, 1992

[30] Foreign Application Priority Data

Oct. 1, 1991 [DE] Fed. Rep. of Germany ....... 4132604

[51] Int. Cl.$^5$ ............................................. G01F 15/04
[52] U.S. Cl. ..................................... 73/861.01; 73/233; 74/395; 74/335; 74/437
[58] Field of Search ............... 73/233, 861.01; 74/395, 74/335, 437, 337

[56] References Cited

U.S. PATENT DOCUMENTS 3,969,939  7/1976  Grzeslo ................................. 73/233
4,498,346  2/1985  Schneider ............................ 73/233

FOREIGN PATENT DOCUMENTS 0197177 10/1986 European Pat. Off. .
841226   6/1952 Fed. Rep. of Germany .
2813433 10/1978 Fed. Rep. of Germany .

Primary Examiner—Richard E. Chilcot, Jr.
Assistant Examiner—Harshad Patel
Attorney, Agent, or Firm—Spencer, Frank & Schneider

[57] ABSTRACT

A measuring device includes a measuring mechanism, a counting mechanism, a variable transmission gear assembly disposed between the measuring mechanism and the counting mechanism, and an adjustment member that engages at the gear assembly for changing the transmission ratio. The gear assembly includes a first shaft and a second shaft which are arranged parallel to one another. First and second out-of-round toothed spur gears are seated on the first shaft. An overrunning clutch is disposed between each one of the first and second spur gears and the first shaft, both overrunning clutches acting in the same direction of rotation. Third and fourth out-of-round spur gears are seated on the second shaft and mesh with the respective first and second spur gears. The third spur gear is rigidly fastened on the second shaft. The fourth spur gear is rotatably mounted on the second shaft. A device for turning the fourth spur gear about a limited adjustment angle relative to the second shaft changes the transmission ratio is actuated by the adjustment member.

12 Claims, 2 Drawing Sheets

MEASURING DEVICE

CROSS REFERENCE TO RELATED APPLICATION

This application claims the priority of Application Ser. No. P 41 32 604.0, filed Oct. 1, 1991, in the Federal Republic of Germany, the subject matter of which is incorporated herein by reference.

BACKGROUND OF THE INVENTION

The present invention relates to a measuring device, particularly a gas meter, including a measuring mechanism, a counting mechanism, a variable transmission gear assembly provided between the measuring mechanism and the counting mechanism and an adjustment member that engages at the gear assembly for changing the transmission ratio.

The present invention is employed, in particular, for bellows gas meters for measuring the consumption of gas in households. Such bellows gas meters have been used extensively for decades and are manufactured in large numbers for new installations and for the continuous replacement of worn-out devices.

With respect to measuring accuracy, public utilities and its customers place high demands on gas meters. Bellows gas meters which generally are equipped with four alternatingly filling and emptying measuring chambers, measure the volume of gas passing through the meter, while the customer must be charged with the heating value of the gas. However, the density of the gas is a function of temperature; it decreases with increasing temperature. The gas temperature is influenced by the seasonal temperature of the gas supplied to the meter, the plumbing between the main terminal in the house and the meter and the location of the meter within the house.

Measures for compensating the temperature of gas meters have been known for a long time in various embodiments. For example, a measuring device for gas has become known, among others, which is provided with a friction gear assembly between the measuring mechanism and the counting mechanism. This gear assembly includes two mutually offset friction discs and two friction wheels that are coupled together by gears and are displaceable on the friction discs by means of a bimetal controlled rotary slide for the purpose of changing the transmission ratio. Temperature caused changes in the volume of the gas to be measured are compensated by an essentially proportional change in the transmission ratio (European Patent Application 0,197,177.A1). However, this device does not operate without slip nor with little wear and has therefore an adverse influence on the measuring accuracy of the gas meter equipped with it.

A pressurized gas meter is known in which two automatic correction systems are included between a measuring mechanism and a counting mechanism. The mechanical devices for compensating temperature as well as pressure each include continuous blocking mechanisms equipped with latch carriers, latch wheels and cams that are successively included in the transmission path and are controlled through levers and toothed sectors by temperature and pressure boxes. These correction systems are very complicated in design from an engineering point of view and their measuring accuracy is limited (German Patent 841,226).

Also known is a gas meter operating with automatic temperature compensation which includes a continuously variable transmission equipped with two oppositely disposed rotary discs that are in operative connection by way of a roll contact element disposed therebetween. To change the transmission ratio, the one rotary disc is axially displaced relative to the other by a temperature influenced expansion device. This compensation device is also mechanically complicated and, since it does not operate without slip, measuring errors are unavoidable (German Patent 2,813,433).

SUMMARY OF THE INVENTION

The object of the invention is the design of a measuring device, particularly a gas meter, which includes a variable transmission gear assembly for temperature compensation, operates without slip, is affected by very low friction losses and minimal wear, and connects the measuring mechanism with the counting mechanism.

The solution of the problem at hand is based on a known measuring device of the type mentioned above which includes a measuring mechanism, a counting mechanism and a variable transmission gear assembly disposed therebetween as well as an adjustment member that engages at this gear assembly for changing the transmission ratio. The problem is solved by the gear assembly including a first shaft and a second shaft which are arranged in parallel juxtaposition; two out of round first spur wheels equipped with teeth are seated on the first shaft; an overrunning clutch is disposed between the two first spur wheels and the first shaft, with both overrunning clutches acting in the same direction of rotation; two likewise out-of-round second spur wheels are seated on the second shaft and each mesh with one of the first spur wheels; the one second spur wheel is rigidly fastened on the second shaft; the other second spur wheel is rotatably mounted on the second shaft and is rotatable by means of a turning device about a limited adjustment angle relative to the second shaft for the purpose of changing the transmission ratio; and the adjustment member actuates the turning device.

Such a transmission equipped with out-of-round gears permits without problems any changes in its transmission ratio during operation so that changes in the temperature of the medium to be measured (particularly the gas) between $-10°$ and $+50°$ C. can be compensated without difficulties. The toothed spur gears employed do not permit any slip between the input shaft and the output shaft, friction losses and wear are negligible if the gear teeth are accurate, if the overrunning clutches are precision manufactured and the shaft bearings are appropriate. The fact that in the gear assembly concept the angular velocity of the driven shaft periodically oscillates during each revolution of the shaft, while the angular velocity of the driving shaft remains uniform - that is, the driven shaft does not rotate with a constant angular velocity—plays no role in the operation of the measuring device; this effect may even be utilized to advantage for compensating all or part of the likewise oscillating driven shaft movements of the measuring mechanism of a bellows gas meter. On the basis of its features, it can be expected of the gear assembly that it operates reliably and without damage even during very extended use of the measuring device over a period of ten or more years.

In a modified embodiment of the invention, the one first spur gear and its wheel disc are fixed to the end of a shaft stub that is coaxial with the first shaft. This structural variation serves to introduce the torque through the proposed stub shaft.

The four out-of-round spur gears of the gear assembly may have an elliptical outline. This outline follows relatively simple geometrical laws which simplifies the manufacture of the spur gears and their teeth.

It may be of advantage for the two first and second spur gears to have a pear-shaped outline. This type of outline results in approximate proportionality between the adjustment angle and the transmission ratio.

For the purpose of economical manufacture, the two meshing pairs of spur gears are advisably given identical configurations and consequently also have the same numbers of teeth.

If small, commercially available overrunning clutches of a hollow cylindrical shape are employed, they are advisably used as hubs for the two first spur gears.

Advantageously the turning device includes a hollow shaft in which the second shaft is rotatably disposed and on which the other, second spur gear is rigidly fastened. This structural configuration of the turning device permits the introduction of torque into the gear assembly directly through the second shaft.

It is advisable for the adjustment member to be utilized for temperature compensation and, for this purpose, it engages, on the one hand, at the second shaft and, on the other hand, at the hollow shaft. If there are changes in the ambient temperature, it turns the hollow shaft relative to the second shaft.

Sufficient variability of the transmission ratio results if the hollow shaft is rotatable relative to the second shaft about an adjustment angle between zero and ninety angular degrees.

Under the given technical conditions, the transmission ratio of the gear assembly is variable between 1:1 and 1:1.3 by turning the hollow shaft relative to the second shaft.

Advantageously, a bimetal element may serve as the adjustment member for temperature compensation.

The bimetal element is advisably a bimetal spiral which surrounds the hollow shaft and whose inner end engages at the second shaft while its outer end engages at the hollow shaft.

BRIEF DESCRIPTION OF THE DRAWINGS

The invention will now be described in greater detail with reference to an embodiment thereof and the attached two drawing sheets, in which.

DETAILED DESCRIPTION OF THE PREFERRED EMBODIMENTS

Figure 1:
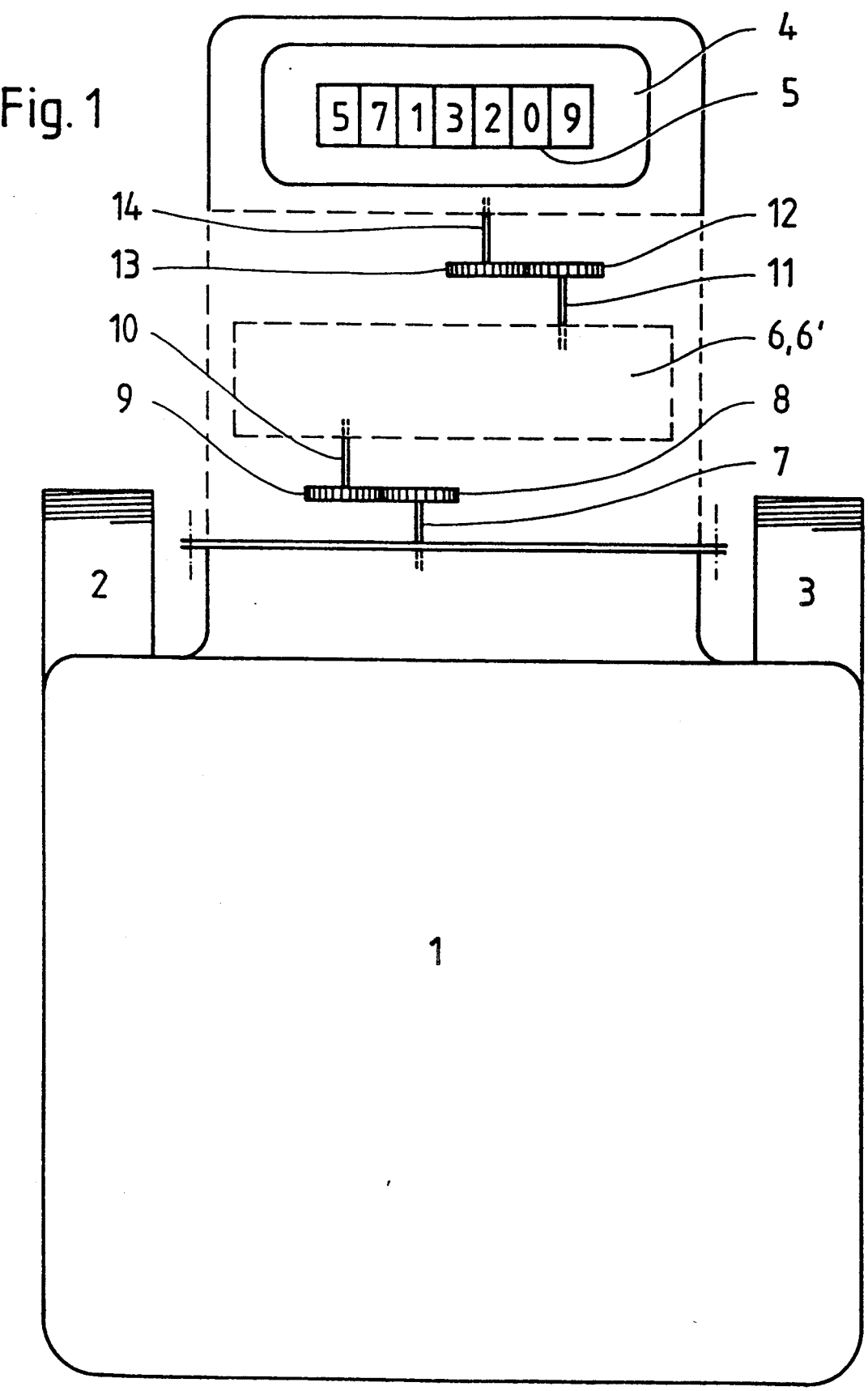
FIG. 1 is a simplified front view of a measuring device in the form of a gas meter.

The measuring device shown in FIG. 1 is a gas meter, namely a bellows gas meter, in whose interior are disposed a measuring mechanism 1 including two measuring chambers, a valve arrangement and a lever and crank drive (not shown). Such a bellows gas meter is disclosed in detail, for example, in applicants' assignee's German Patent 3,707,164. The gas to be measured enters into measuring mechanism 1 through a gas inlet pipe 2, alternatingly actuates the measuring chambers and leaves the measuring mechanism 1 through a gas outlet pipe 3.

A mechanical counter 4 including a numerical display 5 for indicating the gas consumption is disposed in the upper portion of the gas meter. The upper portion is connected in a gas-tight and fire-proof manner with the lower portion of the gas meter which includes the measuring mechanism 1.

Between measuring mechanism 1 and counter 4, a variable transmission gear assembly 6 is disposed. The transmission ratio of this gear assembly 6 is adjustable for the purpose of temperature compensation. A temperature compensation is necessary because the density of the gas changes with the temperature.

The lever and crank drive of measuring mechanism 1 actuates a rotary shaft 7 equipped with a gear 8 which meshes with a drive gear 9 seated on a drive shaft 10 of gear assembly 6. A driven shaft 11 of gear assembly 6 carries a driven gear 12 whose teeth mesh with the teeth of a counter gear 13 that is fastened on a counter shaft 14 that operates counting mechanism 4.

Figure 2:
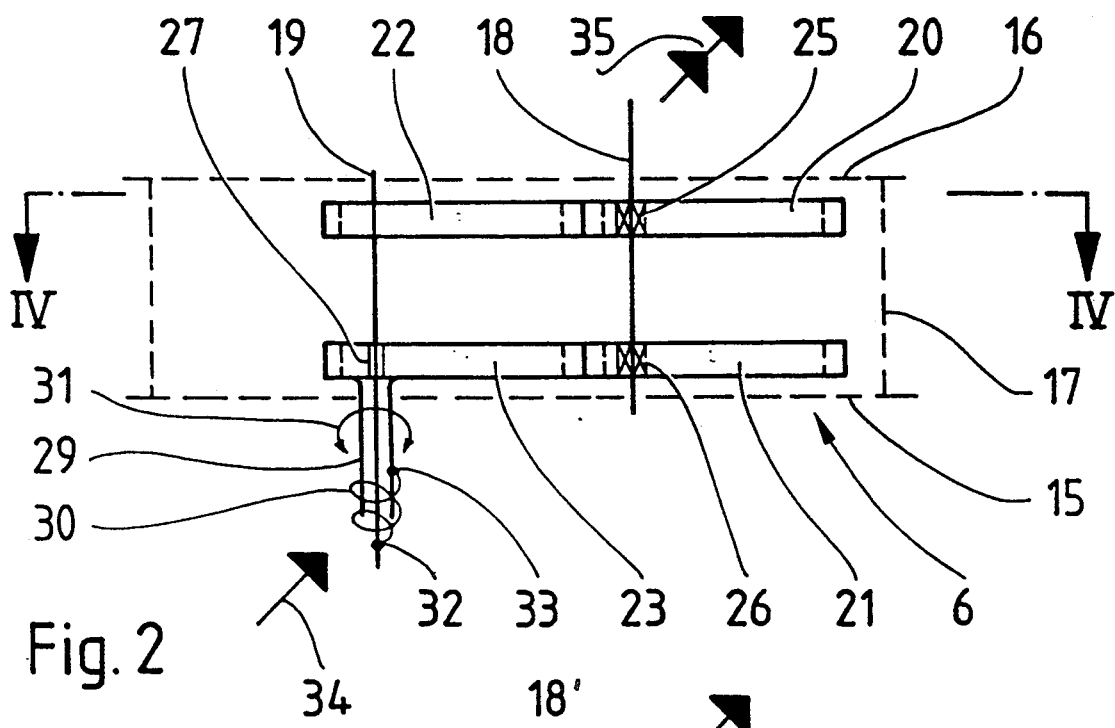
FIG. 2 is a schematic side view representation of a variable transmission gear assembly intended for the measuring device according to FIG. 1.

The gear assembly 6 provided between measuring mechanism 1 and counting mechanism 4 includes—see FIG. 2—a lower bearing plate 15 and an upper bearing plate 16 that lie parallel to one another and are connected with one another by bearing pin 17. The components of gear assembly 6 are disposed between the two bearing plates 15 and 16.

Gear assembly 6 includes a first shaft 18 and a second shaft 19 which are parallel to one another and spaced from one another; they are rotatably mounted in the two bearing plates 15 and 16.

Figure 4:
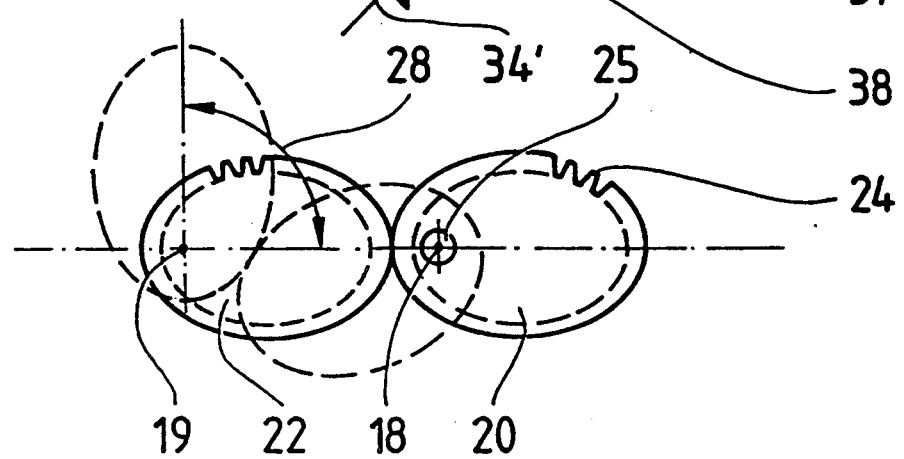
FIG. 4 is a sectional view of the gear assembly according to FIG. 2, seen along line IV—IV of FIG. 2.

Two out-of-round first spur gears 20 and 21 are seated on the first shaft 18 and two likewise out-of-round second spur gears 22 and 23 are seated on the second shaft 19. The upper first spur gear 20 meshes with the upper second spur gear 22 and the lower first spur gear 21 meshes with the lower second spur gear 23. The two first spur gears 20 and 21 and the two second spur gears 22 and 23 are of identical configuration, they have an elliptical outline (see FIG. 4), are equipped with teeth 24, that is, with corresponding rings of teeth, and have the same number of teeth. All spur gears 20 to 23 as well as the rings of teeth may be made of plastic.

Between the two first spur gears 20 and 21 and the first shaft 18 there is disposed an upper overrunning clutch 25 and a lower overrunning clutch 26. Both overrunning clutches 25 and 26 serve as hubs for the two first spur gears 20 and 21, and are installed in such a manner that they act in the same direction of rotation. These are commercially available components also called "free-wheeling" elements. The one (upper) second spur gear 22 is rigidly fastened to the second shaft 19. The other (lower) second spur gear 23 is rotatably mounted at 27 on second shaft 19 and is rotatable by means of a turning device about a limited adjustment angle 28 (see FIG. 4) relative to the second shaft 19 in order to change the transmission ratio. This turning device includes a hollow shaft 29 in which the second shaft 19 is rotatably arranged and on which the other (lower) second spur wheel 23 is rigidly fastened. The adjustment angle 28 of hollow shaft 29 relative to the second shaft 19 is variable between zero and ninety angular degrees.

An adjustment member 30 actuates the adjustment device. This adjustment member 30, which is able to steadily change the transmission ratio of gear assembly 6 during its operation, engages—as indicated in FIG. 2—on the one hand, at the second shaft 19 and, on the other hand, at the hollow shaft 29, and turns the hollow shaft 29 relative to the second shaft 19, as indicated by the curved double arrow 31, in both directions if the ambient temperature changes. Adjustment member 30 establishes an operative connection between the second shaft 19 and the hollow shaft 29, a connection that is variable within the limits of adjustment angle 28.

Both second spur gears 22 and 23 rotate together with the second shaft 19, but their mutual angular position is variable within limits during their rotation. Gear assembly 6 is designed in such a way that its transmission ratio is variable between 1:1 and 1:1.3 by turning hollow shaft 29 relative to second shaft 19.

The adjustment member 30 employed for temperature compensation in gear assembly 6 is a bimetal element. It is a commercially available bimetal spiral which—as indicated in FIG. 2—loosely surrounds hollow shaft 29 and whose inner end 32 is fastened to second shaft 19 while its outer end 33 is fastened to hollow shaft 29.

In the gear assembly 6 shown in FIG. 2, the torque generated by measuring mechanism 1 is introduced into the second shaft, which is connected with hollow shaft 29 as shown by large arrow 34 and is transmitted from the first shaft 18 to counting mechanism 4 with a variable rate of rotation as shown by the large double arrow 35. This direction of operation may also be reversed in that the torque is fed to the first shaft 18 and picked up by the second shaft 19.

During operation of gear assembly 6 the second shaft 19 and the two second, out-of-round spur gears 22 and 23 are driven by measuring mechanism 1 at a constant angular velocity. The two meshing, out-of-round first spur gears 20 and 21 rotate at an angular velocity that is not constant. The two overrunning clutches 25 and 26 on which the two first spur gears 20 and 21 are seated here cause only the first spur gear 20 and 21, respectively, which at the moment rotates with the greater angular velocity to carry along first shaft 18 (here the driven shaft). If the adjustment angle 28 between the two second spur gears 22 and 23 equals zero, then the transmission ratio is 1:1, that means, one revolution of second shaft 19 corresponds to one revolution of first shaft 18, even if their momentary angular velocity changes by alternatingly increasing and decreasing; these changes are insignificant for counting mechanism 4 because it does not react to them.

If now adjustment member 30 (the bimetal spiral) turns the two second spur gears 22 and 23 out of their mutual angular position because of a change in the temperature of the gas to be measured so that an adjustment angle 28 greater than zero results, then—considering the momentarily different distances of the point of contact between the two roll curves on the connection line of the rotation axis relative to these rotation axes with meshing spur gears 20, 22 and 21, 23—the inconstancy of the angular velocities of the two driven first spur gears 20 and 21 that are driven by way of overrunning clutches 25 and 26 becomes greater, resulting in an increase of the transmission ratio.

Figure 3:
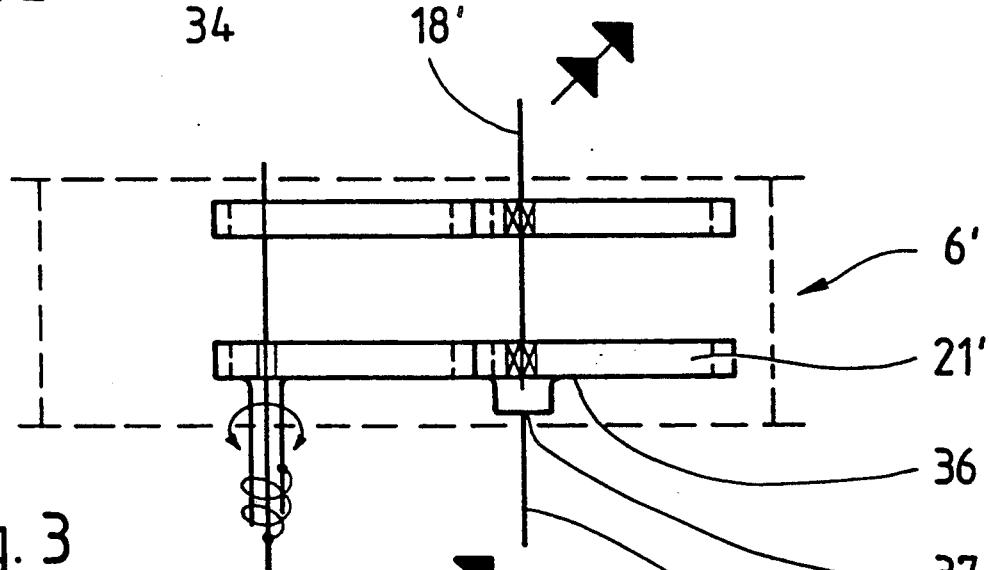
FIG. 3 is a schematic side view of another embodiment of a gear assembly for the measuring device of FIG. 1.

The gear assembly 6' shown in FIG. 3 substantially coincides with the assembly shown in FIG. 2 and discussed in detail above. The only difference is that the wheel disc 36 of the first (lower) out-of-round spur gear 21' is fixed to the end 37 of a stub shaft 38 that is coaxial with first shaft 18'. In this embodiment, this stub shaft 38 serves to introduce the torque into gear assembly 6' according to arrow 34'. This gear assembly 6' is also effective in the opposite direction, that is, driving side and driven side are interchangeable.

It will be understood that the above description of the present invention is susceptible to various modifications, changes and adaptations, and the same are intended to be comprehended within the meaning and range of equivalents of the appended claims.

What is claimed is:

1. A measuring device comprising:
   a measuring mechanism;
   a counting mechanism;
   a variable transmission gear assembly disposed between the measuring mechanism and the counting mechanism; and
   adjustment means that engages at the gear assembly for changing the transmission ratio, wherein:
   the gear assembly includes a first shaft and a second shaft which are arranged parallel to one another;
   first and second out-of-round toothed spur gears are seated on the first shaft;
   an overrunning clutch disposed between each one of the first and second spur gears and the first shaft, both overrunning clutches acting in the same direction of rotation;
   third and fourth out-of-round spur gears seated on the second shaft and meshing with the respective first and second spur gears on the said first shaft;
   the third spur gear rigidly fastened on the second shaft;
   the fourth spur gear rotatably mounted on the second shaft;
   means for turning the fourth spur gear about a limited adjustment angel relative to the second shaft thereby changing the transmission ratio; and
   the adjustment means actuates the means for turning.

2. A measuring device according to claim 1, further comprising a stub shaft coaxial with the first shaft, wherein the second spur gear includes a wheel disc fixed to the end of the stub shaft.

3. A measuring device according to claim 1, wherein the first and second spur gears and the third and fourth spur gears have an elliptical outline.

4. A measuring device according to claim 1, wherein the first and second spur gears and the third and fourth spur gears have a pear shaped outline.

5. A measuring device according to claim 1, wherein the first and second spur gears and the third and fourth spur gears are of identical configuration and have the same number of teeth.

6. A measuring device according to claim 1, wherein the overrunning clutches serve as hubs for the first and second spur gears.

7. A measuring device according to claim 1, wherein the means for turning includes a hollow shaft in which the second shaft is rotatably arranged and on which the fourth spur gear is rigidly fastened.

8. A measuring device according to claim 7, wherein the adjustment means acts as a temperature compensation means and engages, on the one hand, at the second shaft and, on the other hand, at the hollow shaft and, wherein, in response to a change in ambient temperature, the adjustment means turns the hollow shaft relative to the second shaft.

9. A measuring device according to claim 8, wherein an angle of the hollow shaft relative to the second shaft is variable between zero and ninety angular degrees by the adjustment means.

10. A measuring device according to claim 1, wherein the transmission ratio of the gear assembly can be varied between 1:1 and 1:1.3 by turning the hollow shaft relative to the second shaft.

11. A measuring device according to claim 8, wherein the adjustment means for temperature compensation comprises a bimetal element.

12. A measuring device according to claim 11, wherein the bimetal element comprises a bimetal spiral which surrounds the hollow shaft having an inner end engaging on the second shaft and an outer end of the hollow shaft.

* * * * *